Feb. 1, 1927.

A. H. KINZEL

GASKET

Filed April 1, 1926

1,616,088

INVENTOR.
ARCH H. KINZEL
BY
ATTORNEY.

Patented Feb. 1, 1927.

1,616,088

UNITED STATES PATENT OFFICE.

ARCH H. KINZEL, OF AKRON, OHIO, ASSIGNOR TO THE AKRON METALLIC GASKET COMPANY, OF AKRON, OHIO, A CORPORATION OF OHIO.

GASKET.

Application filed April 1, 1926. Serial No. 98,940.

This invention relates to gaskets and particularly to that type comprising a suitable packing material, such as asbestos enclosed in a sheath of metal such as copper.

Heretofore, it has been proposed to sheath the packing material by two metal sheets enclosing the packing material. One such sheath construction comprises an annular sheet the width of the packing for one side of the gasket and a second annular sheet for the other side of the gasket of such width that it may be folded about both the inner and outer peripheries of the packing and pressed into overlapping relation with the marginal portions of the first sheet. This, however, does not effectively lock the parts of the gasket together.

The other construction is substantially a double-sheath construction, the metal sheets of both sides of the gasket being of sufficient width to be folded about both the inner and outer peripheries of the gasket and into overlapping relationship with each other on both sides of the gasket. This construction is expensive in the use of metal and is stiffer and less resilient than is desirable.

According to the present invention, a gasket of the above type is provided, in which not only the same or minimum amount of metal is employed as in the first construction mentioned above, but the parts are securely locked together and a less expensive, more resilient construction obtained than that secondly described.

Moreover, the gasket of the present invention presents a more even surface since the single, overlapped flange on each side is effectively embedded in the surface of the gasket under the pressing operation usually employed in constructing gaskets of this type.

The invention will be be better understood from the following brief description thereof and by reference to the accompanying drawings. It will be apparent that the invention is not limited to the specific embodiment herein described.

Of the accompanying drawings, Figure 1 is a plan of a gasket embodying the invention;

Figure 1:
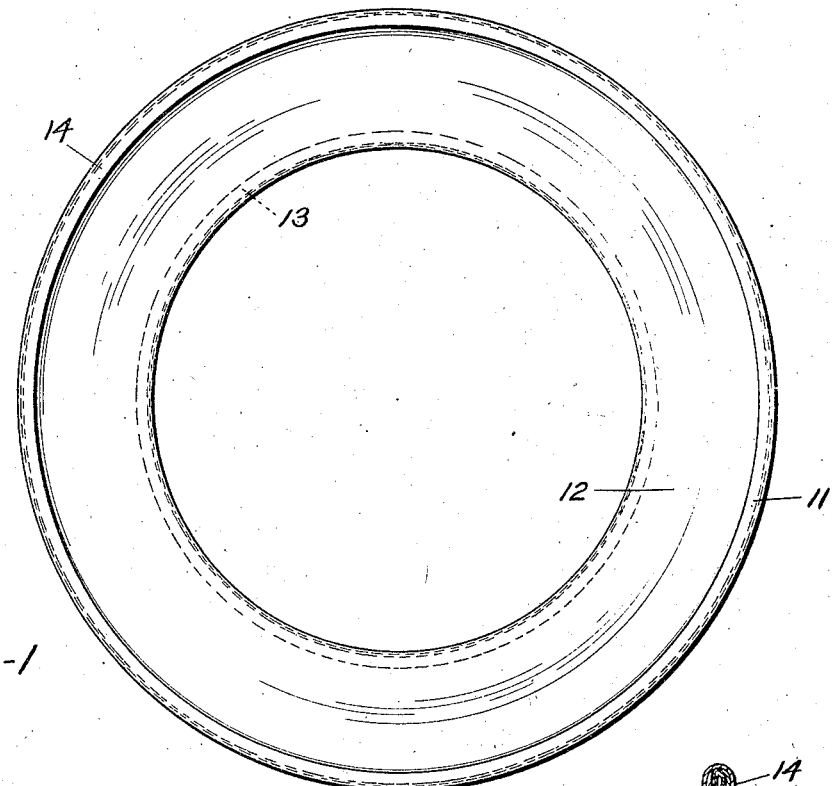

Referring to the drawings, 10 designates packing material such as sheet asbestos cut to gasket shape, i. e., either annular, polygonal, or otherwise. Packing 10 is enclosed by sheets 11 and 12, sheet 11 being so formed as to provide an inwardly extending flange 13 and sheet 12 an outwardly extending flange 14 for folding about the inner and outer edges respectively of the packing material 10.

Figure 3:
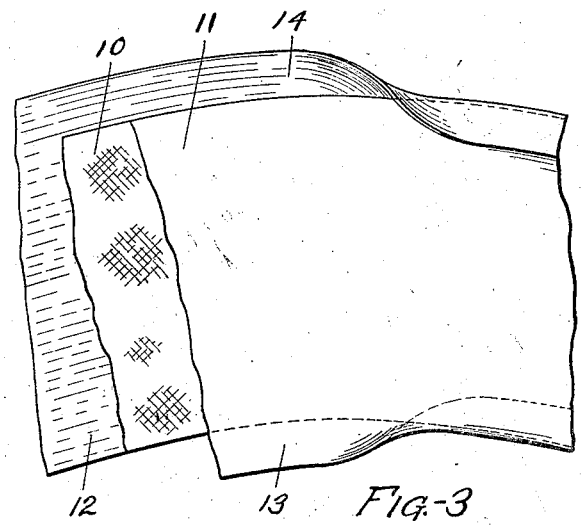
Figure 3 is an enlarged detail illustrating the manner of folding the sheets of metal sheating about the packing material.
Figure 2:
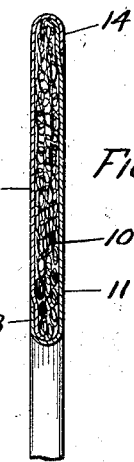
Figure 2 is a section therethrough.

As shown in Figures 2 and 3, flange 13 is folded about the inner edge of the gasket into overlapping relationship with the inner marginal portion of sheet 12 and flange 14 is folded about the outer edge of the gasket into overlapping relationship to sheet 11. The gasket is then compressed so as to embed flanges 13 and 14 therein so as to be flush with the surface thereof. Bolt or port holes may be forced through the gasket if required.

It will be noted that a minimum of metal is employed for the covering and that both sheets 11 and 12 are securely locked to the packing 10 and to each other.

Modifications of the invention may be resorted to without departing from the spirit thereof or the scope of the appended claim. The term "periphery" as used in the claim is intended to include perimeters of polygonal gaskets.

What is claimed is:

A gasket comprising a sheet of packing material and a metallic sheath therefor, said sheath comprising two sheets on opposite sides of the gasket, one being provided with a flange folded about the inner periphery of the gasket into overlapping relationship with the inner marginal portion of the other sheet, said other sheet being formed with a flange folded about the outer periphery of the gasket into overlapping relationship to the outer marginal portion of the first sheet.

ARCH H. KINZEL.